(12) United States Patent
Otaka et al.

(10) Patent No.: US 11,477,806 B2
(45) Date of Patent: Oct. 18, 2022

(54) COMMUNICATION DEVICE, COMMUNICATION SYSTEM, RADIO BASE STATION, COMMUNICATION CONTROL METHOD, AND STORAGE MEDIUM

(71) Applicant: HONDA MOTOR CO., LTD., Tokyo (JP)

(72) Inventors: Masaru Otaka, Wako (JP); Ryusuke Tamanaha, Wako (JP); Yusuke Oi, Tokyo (JP); Takahiro Iijima, Tokyo (JP); Naoko Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/176,212

(22) Filed: Feb. 16, 2021

(65) Prior Publication Data
US 2021/0258982 A1 Aug. 19, 2021

(30) Foreign Application Priority Data

Feb. 19, 2020 (JP) .............................. JP2020-026523

(51) Int. Cl.
*H04W 72/12* (2009.01)
*H04W 36/08* (2009.01)

(52) U.S. Cl.
CPC ....... *H04W 72/1247* (2013.01); *H04W 36/08* (2013.01); *H04W 72/1268* (2013.01)

(58) Field of Classification Search
CPC ......... H04W 28/0819; H04W 72/1247; H04W 28/0967; H04W 28/0226; H04W 72/1268;
(Continued)

(56) References Cited

U.S. PATENT DOCUMENTS

| | | | | |
|---|---|---|---|---|
| 2009/0318155 A1* | 12/2009 | Fukuzawa | ......... | H04W 36/0061 455/438 |
| 2010/0285806 A1* | 11/2010 | Iwamura | ............... | H04W 36/30 455/437 |
| 2014/0171065 A1* | 6/2014 | Graessley | ............. | H04W 76/19 455/426.1 |

FOREIGN PATENT DOCUMENTS

JP 2017-120997 7/2017

* cited by examiner

*Primary Examiner* — Anez C Ebrahim
(74) *Attorney, Agent, or Firm* — Amin, Turocy & Watson, LLP

(57) ABSTRACT

A communication device, comprising: communication-part communicates with external device by first-communication-system provided at first-access-point or by second-communication-system provided at second-access-point, determination-part dynamically determines communication priority level of host device with respect to each of first and/or second-access-point; and communication controller transmits information including communication priority level and moving body information with respect to each of first and second-access-points, communication controller communicates with external device through first-communication-system in accordance with communication priority level determined at first-access-point or second-communication-system in accordance with communication priority level determined at second-access-point, communicates in accordance with communication priority level determined at second-access-point when the communication is switched from first-access-point to second-access-point, and communicates in accordance with communication priority level determined at first-access-point when communication of communication-part is switched from communication of second-access-point to communication of first-access-point.

13 Claims, 8 Drawing Sheets

(58) Field of Classification Search
CPC ............ H04W 36/08; H04W 28/0812; H04W 36/00835
See application file for complete search history.

| IDENTIFICATION INFORMATION | TYPE OF TRANSMISSION SOURCE DEVICE | TRANSMISSION DATA TYPE | COMMUNICATION PRIORITY LEVEL |
|---|---|---|---|
| *** | VEHICLE | ***(VEHICLE INFORMATION:USED FOR CONTROL) | 8 |
| *** |  | ***(VEHICLE INFORMATION:NOT USED FOR CONTROL) | 6 |
| *** |  | ***(VEHICLE INFORMATION:CONTENTS INFORMATION) | 3 |
| *** | SMART PHONE | ***(CALL INFORMATION) | 8 |
| *** |  | ***(CONTENT INFORMATION) | 4 |
| *** | GAME MACHINE | ***(GAME INFORMATION) | 2 |
| ... | ... | ... | ... |

52

| MOVING BODY COMMUNICATION NETWORK | COMMUNICATION PRIORITY LEVEL |
|---|---|
| 4G | 1~2 |
| 4G | 3~4 |
| 5G | 5~6 |
| 5G | 7~8 |

| IDENTIFICATION INFORMATION | COMMUNICATION PRIORITY LEVEL |
|---|---|
| ***(FIRST ACCESS POINT) | 8 |
| ***(SECOND ACCESS POINT) | 7 |
| ***(THIRD ACCESS POINT) | 3 |
| ***(RADIO BASE STATION 10) | 5 |

| IDENTIFICATION INFORMATION | TYPE OF TRANSMISSION SOURCE DEVICE | TRANSMISSION DATA TYPE | COMMUNICATION BAND |
|---|---|---|---|
| *** | VEHICLE | ***(VEHICLE INFORMATION:USED FOR CONTROL) | WIDE |
| *** | | ***(VEHICLE INFORMATION:NOT USED FOR CONTROL) | NARROW |
| *** | | ***(VEHICLE INFORMATION:CONTENTS INFORMATION) | WIDE |
| *** | SMART PHONE | ***(CALL INFORMATION) | WIDE |
| *** | | ***(CONTENT INFORMATION) | WIDE |
| *** | GAME MACHINE | ***(GAME INFORMATION) | NARROW |
| ... | ... | ... | ... |

COMMUNICATION DEVICE, COMMUNICATION SYSTEM, RADIO BASE STATION, COMMUNICATION CONTROL METHOD, AND STORAGE MEDIUM

CROSS-REFERENCE TO RELATED APPLICATION

Priority is claimed on Japanese Patent Application No. 2020-026523, filed Feb. 19, 2020, the content of which is incorporated herein by reference.

BACKGROUND OF THE INVENTION

Field of the Invention

The present invention relates to a communication device, a communication system, a radio base station, a communication control method, and a storage medium.

Description of Related Art

In recent years, a technology of determining a communication priority level according to a usage status of a data communication service is known (for example, see Japanese Unexamined Patent Application, First Publication No. 2017-120997)

SUMMARY OF THE INVENTION

That is, in recent years, research has been carried out on automatically controlling vehicles. In order to automatically control vehicles, it is required to preferentially transmit and receive a large amount of information related to control of the vehicles through continuous high-speed and low-delay communication. In addition, since the vehicles move in a range of a network provided by a data communication service, a vehicle is required to determine a communication priority level for each network that can be used at a position of the vehicle and preferentially perform communication using that network. However, in the related art, it is difficult to determine the communication priority level according to the communication used by the vehicle every time.

An aspect of the present invention is directed to providing a communication device, a communication system, a radio base station, a communication control method, and a storage medium that are capable of determining a communication priority level according to communication used by a vehicle.

A communication device, a communication system, a radio base station, a communication control method, and a storage medium according to the present invention employ the following configurations.

(1) A communication device of an aspect of the present invention is a communication device mounted on a moving body, including: a communication part configured to communicate with an external device through a communication by a first communication system provided at a first access point or a communication by a second communication system provided at a second access point, the second communication system being different from the first communication system; a determination part configured to dynamically determine a communication priority level of a host device with respect to each of the first access point and/or the second access point; and a communication controller configured to cause the communication part to transmit information, which includes information showing the communication priority level determined by the determination part and moving body information related to the moving body, with respect to each of the first access point and the second access point, wherein the communication controller causes the communication part to communicate with the external device through the first communication system in accordance with the communication priority level determined at the first access point or the second communication system in accordance with the communication priority level determined at the second access point, to communicate in accordance with the communication priority level determined at the second access point when the communication of the communication part is switched from the communication of the first access point to the communication of the second access point, and to communicate in accordance with the communication priority level determined at the first access point when the communication of the communication part is switched from the communication of the second access point to the communication of the first access point.

(2) In the communication device according to the aspect of the above-mentioned (1), the first communication system may be a cellular system, and the first access point may be a base station for communication via the cellular system.

(3) In the communication device according to the aspect of the above-mentioned (1) or (2), the second communication system may be Wi-Fi, and the second access point may be an access point for Wi-Fi communication.

(4) The communication device according to the aspect of any one of the above-mentioned (1) to (3) may further include an acquisition part configured to acquire moving body information related to the moving body from one or more on-vehicle instruments mounted on the moving body, the determination part may determine the communication priority level on the basis of the moving body information acquired by the acquisition part, and the communication controller may cause the communication part to communicate the moving body information acquired by the acquisition part.

(5) In the communication device according to the aspect of any one of the above-mentioned (1) to (4), the moving body information may include status information showing a traveling state of the moving body, and the determination part may determine the communication priority level on the basis of the status information.

(6) In the communication device according to the aspect of any one of the above-mentioned (1) to (5), the first access point and/or the second access point may assign a communication band for communication with the communication part as the communication priority level, and the communication part may perform communication regarding the moving body information with respect to the external device by the communication band assigned at the first access point and/or the second access point.

(7) In the communication device according to the aspect of any one of the above-mentioned (1) to (6), the communication controller may store information showing the communication priority level determined at the second access point in a storage part when the communication of the communication part is switched from the communication in the second access point to the communication in the first access point.

(8) In the communication device according to the aspect of any one of the above-mentioned (1) to (7), the communication controller may store information showing the communication priority level determined at the first access point in a storage part when the communication of the communication part is switched from the communication in the first access point to the communication in the second access point.

(9) A communication system of another aspect of the present invention includes the communication device according to the aspect of any one of the above-mentioned (1) to (8); the first access point; and the second access point.

(10) A radio base station of another aspect of the present invention includes an acquisition part configured to acquire moving body information showing a first communication priority level from a moving body; a determination part configured to acquire information related to movement of the moving body, determine the first communication priority level and determine another base station which takes over the first communication priority level; and an output part configured to output the first communication priority level to the moving body as a response to the moving body information acquired by the acquisition part and to output the first communication priority level to the other base station.

(11) In the radio base station according to the aspect of the above-mentioned (10), the acquisition part may acquire the response of the other base station according to the first communication priority level output by the output part, the determination part may further determine a second communication priority level having lower priority level than the first communication priority level when the response acquired by the acquisition part does not show that the communication according to the first communication priority level is possible, and the output part may output the second communication priority level determined by the determination part to the moving body or the other base station.

(12) A communication control method of another aspect of the present invention is executed by a computer configured to realize a communication device mounted on a moving body, the method including: performing communication with an external device through a communication by a first communication system provided by a first access point or a communication by a second communication system provided by a second access point, the second communication system being different from the first communication system; dynamically determining a communication priority level of a host device with respect to each of the first access point and/or the second access point; transmitting information, which includes information showing the determined communication priority level and moving body information related to the moving body, with respect to each of the first access point and the second access point; performing communication with the external device through the first communication system in accordance with the communication priority level determined at the first access point or the second communication system in accordance with the communication priority level determined at the second access point; performing communication in accordance with the communication priority level determined at the second access point when the communication is switched from the communication of the first access point to the communication of the second access point; and performing communication in accordance with the communication priority level determined at the first access point when the communication is switched from the communication of the second access point to the communication of the first access point.

(13) A computer-readable storage medium of another aspect of the present invention, on which a program is stored to cause a computer configured to realize a communication device mounted on a moving body to: perform communication with an external device through a communication by a first communication system provided by a first access point or a communication by a second communication system provided by a second access point, the second communication system being different from the first communication system; dynamically determine a communication priority level of a host device with respect to each of the first access point and/or the second access point; transmit information, which includes information showing the determined communication priority level and moving body information related to the moving body, with respect to each of the first access point and the second access point; perform communication with the external device through the first communication system in accordance with the communication priority level determined at the first access point or the second communication system in accordance with the communication priority level determined at the second access point; perform communication in accordance with the communication priority level determined at the second access point when the communication is switched from the communication of the first access point to the communication of the second access point; and perform communication in accordance with the communication priority level determined at the first access point when the communication is switched from the communication of the second access point to the communication of the first access point.

According to the aspects of the above-mentioned (1) to (13), the communication priority level can be determined according to the communication used by the vehicle.

According to the aspect of the above-mentioned (5), the communication can be easily preferentially performed according to a situation of the vehicle.

According to the aspect of the above-mentioned (6), the information related to the vehicle can be easily communicated by a band having a band guarantee.

BRIEF DESCRIPTION OF THE DRAWINGS

FIG. 6 is a view showing an example of contents of history information.

FIG. 9 is a view showing an example of contents of reference information used when a first determination part determines a communication band.

DETAILED DESCRIPTION OF THE INVENTION

Hereinafter, a first embodiment of a communication device, a communication system, a radio base station, a communication control method, and a program of the present invention will be described with reference to the accompanying drawings. Hereinafter, a communication system including a vehicle in which a communication device is mounted will be described. The vehicle is, for example, a two-wheeled, a three-wheeled, or a four-wheeled vehicle, or the like, and a driving source thereof is an internal combustion engine such as a diesel engine, a gasoline engine, or the like, an electric motor, or a combination thereof. The electric motor is operated using energy generated by a generator connected to an internal combustion engine, or discharged energy of a secondary battery or a fuel cell.

First Embodiment

Figure 1:
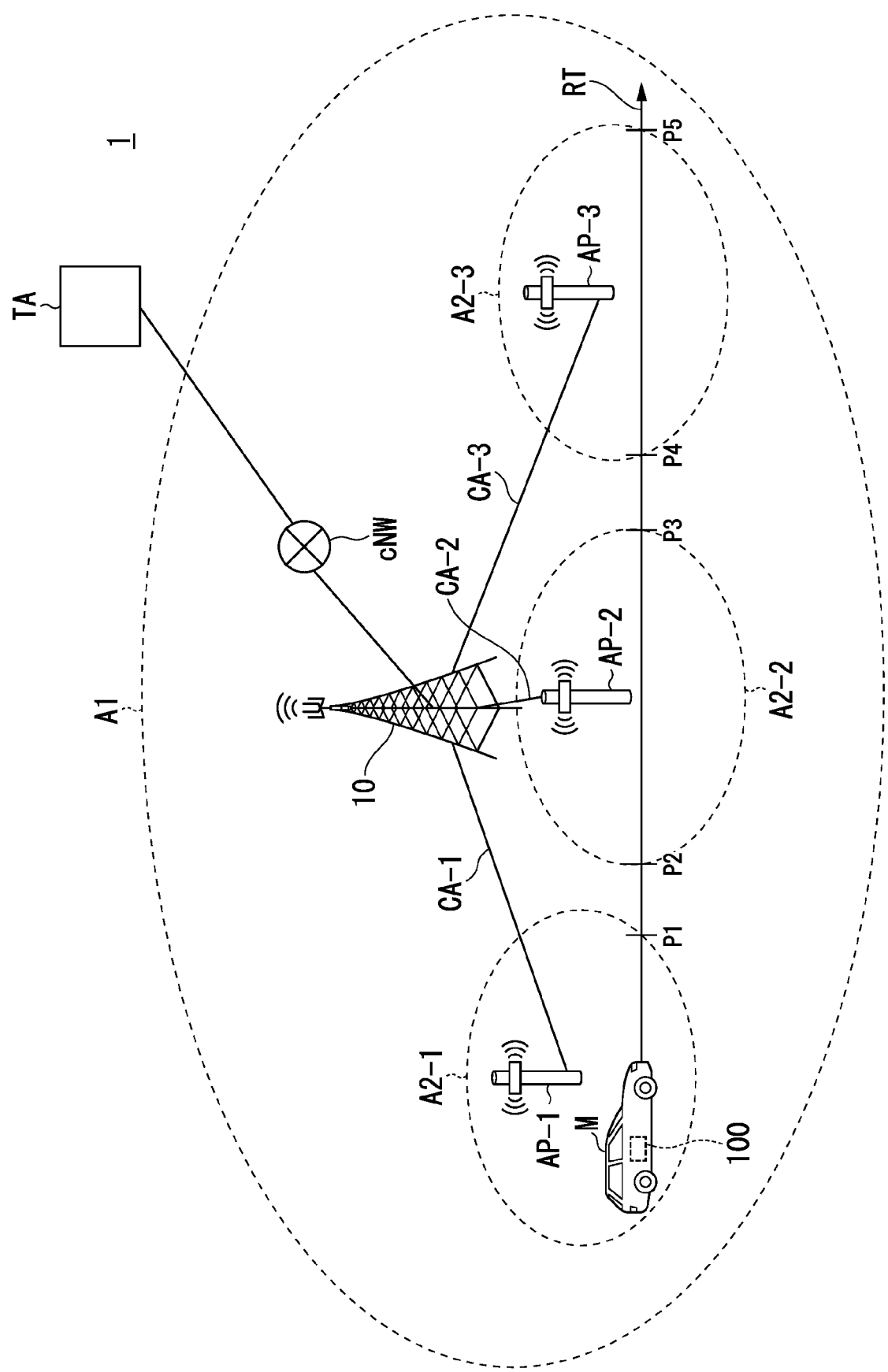
FIG. 1 is a view showing an example of a communication system including a vehicle provided with a communication device of a first embodiment.

FIG. 1 is a view showing an example of a communication system 1 including a vehicle provided with a communication device of a first embodiment. The communication system 1 includes, for example, one or more radio base stations 10, and a communication device 100 mounted on a vehicle M. Hereinafter, the case in which the communication system 1 includes one radio base station 10 will be described.

The radio base station 10 performs communication with the vehicle M present within a predetermined communication range A1 or other communication terminal devices through wireless communication. The predetermined communication range A1 is set according to, for example, communication standards or the like, and is a range of about several hundreds of [m] to several kilo[m] around the radio base station 10. A communication network provided within the communication range A1 according to the radio base station 10 is, for example, a cellular network. The cellular network is, for example, a third-generation mobile communication network (3G), a fourth-generation mobile communication network (hereinafter, 4G, (long term evolution (LTE, registered trademark)), a fifth-generation mobile communication network (hereinafter, 5G), a mobile communication network of a sixth or later generation, or the like. Hereinafter, communication networks provided within the communication range A1 by the radio base station 10 are two types of mobile communication network, for example, 4G and 5G. 4G may include long term evolution (LTE, registered trademark).

In addition, the radio base station 10 is connected to a plurality of access points AP present in the communication range A1 via cables CA. In an example of FIG. 1, three access points AP-1 to AP-3 are present in the communication range A1, and connected to the radio base station 10 via the cables CA-1 to CA-3. A numerical character after a hyphen at an end of a reference sign is an identifier configured to distinguish components related to every access point AP. When components related to the access points AP are not distinguished, numerical characters after a hyphen at an end of a reference sign will be omitted. The cables CA-1 to CA-3 are, for example, optical fiber cables, or the like, through which communication faster than wireless communication is possible. Further, the radio base station 10 and the access points AP-1 to AP-3 may be connected to each other in at least a partial section through wireless communication.

Each of the access points AP-1 to AP-3 includes, for example, an antenna (not shown) for transmission and reception, a communication control device (not shown), or the like. In communication ranges A2-1 to A2-3 smaller than the communication range A1 of the radio base station 10, communication with the vehicle M in the area or other communication terminals is performed. In addition, each of the communication ranges A2-1 to A2-3 is an example of a small cell (S cell). In the S cell, a U-plane signal is transmitted and received, and in particular, user data other than voice data is transmitted and received. A plurality of S cells may be provided in a P cell. The vehicle M can be connected to a plurality of S cells. In addition, a communication range of an S cell may overlap a communication range of another S cell. When communication ranges overlap each other, by making the frequency bands of the S cells different from each other, interference between radio waves transmitted from the S cells can be prevented.

The communication between the access points AP-1 to AP-3 is, for example, communication of a communication system compliant with Wi-Fi (registered trademark). Each of the access points AP-1 to AP-3 performs communication with the vehicle M using, for example, a communication system pursuant to Wi-Fi through control of a communication control device. The Wi-Fi network is, for example, a radiowave communication network in which each individual or each company can freely use their own network. Communication standards of a communication system compliant with Wi-Fi have an extremely narrow range of radiowaves, and there is a limitation in use thereof to about 10 to 100 [m] from a Wi-Fi antenna position. In addition, communication is performed in a predetermined frequency band (for example, a 5 [GHz] band, or a 2.4 [GHz] band) in the Wi-Fi network.

The communication device 100 mounted on the vehicle M acquires a status of communication between the radio base station 10 and an access point AP present in a communication range when present in the communication range A1 of the radio base station 10 or present in a communication range A2 of the access point AP. Then, the communication device 100 performs communication after determining a communication destination on the basis of the acquired communication status.

In addition, the communication device 100 performs carrier aggregation (CA) control using radiowaves of different frequency bands by connecting the access points and the radio base station 10 when the communication device 100 is present in a communication range of a plurality of access points AP. Accordingly, the communication device 100 can increase a bandwidth, and improvement of throughput can be achieved. The radio base station 10 with which a mobile communication network such as a cellular network or the like communicates is an example of "a first access point," the access point AP is an example of "a second access point," the communication of the cellular system via the mobile communication network is an example of "communication of the first communication system" and the communication via the Wi-Fi network is an example of "communication of the second communication system."

In the communication system shown in FIG. 1, while the access points AP-1 to AP-3 are connected to the same radio base station 10, the access points may also be connected to another base station and managed in a plurality of base stations. Transmission and reception of data can be performed via the plurality of base stations using such a dual connectivity (DC) function.

The communication device 100 performs communication with the radio base station 10 or the access point AP when performing communication related to the vehicle information with an external device TA which is a communication target. The communication device 100 requires a communication priority level related to communication from the radio base station 10 or the access point AP. The communication priority level is determined on the basis of the communication priority level required by the communication device 100. The communication device 100 performs the communication related to the vehicle information using at least one of the external device TA and either the radio base station 10 or the access point AP according to the communication priority level when the communication with the external device TA according to the communication priority level required by the radio base station 10 or the access point AP is accepted. For example, the external device TA may be an application server configured to acquire the vehicle information from the communication device 100 and transmit the information to the vehicle M. Specifically, the external device TA is a device that constitutes a driving assistance system configured to receive vehicle information from one or more vehicles M, generate information related to traveling assistance of the vehicle M and transmit the information to the vehicle M. The external device TA is connected to a core network cNW through wired connection. In addition, the external device TA is provided outside the vehicle M.

The vehicle information is, for example, detection results of various vehicle sensors mounted on the vehicle M, image data generated by imaging a surrounding environment of the vehicle M using cameras mounted on the vehicle M, content information reproduced by a content reproduction apparatus or the like mounted on the vehicle M, and information (in particular, biological information) or the like related to a state of an occupant in the vehicle M, or the like. Further, these pieces of vehicle information are exemplary and not limited thereto, and may be information exchanged by the vehicle and information exchanged with the external device TA outside the vehicle. The vehicle information is an example of "moving body information."

Here, the vehicle M may travel in the communication range A2 after traveling in the communication range A1. In FIG. 1, when traveling along a route RT in the communication range A1, the vehicle M moves from the communication range A2-1 to the communication range A1 at a position P1, moves from the communication range A1 to the communication range A2-2 at a position P2, moves from the communication range A2-2 to the communication range A1 at a position P3, moves from the communication range A1 to the communication range A2-3 at a position P4, and moves from the communication range A2-3 to the communication range A1 at a position P5. In this way, when the vehicle M moves through the communication range A1 or the communication range A2, it is troublesome for the communication device 100 to perform processing of determining a communication priority level in a communication range of a destination and processing of requesting the determined communication priority level from the radio base station 10 or the access point AP at each of respective times. In particular, when during the vehicle M was transmitting and receiving information related to traveling control of the external device TA and the vehicle, it is not preferable that the priority level changes during traveling depending on the connected communication partner (the radio base station 10, the access point AP).

The communication device 100 performs communication related to the vehicle information with the external device TA according to the communication priority level simply accepted by the radio base station 10 or the access point AP even when the communication range in which the vehicle M is present is changed. The processing of the communication device 100 will be described below in detail.

Next, the configuration of the radio base station 10 and the configuration of the vehicle M on which the communication device 100 is mounted will be described in detail.

[Radio Base Station]

Figures 2, 3:
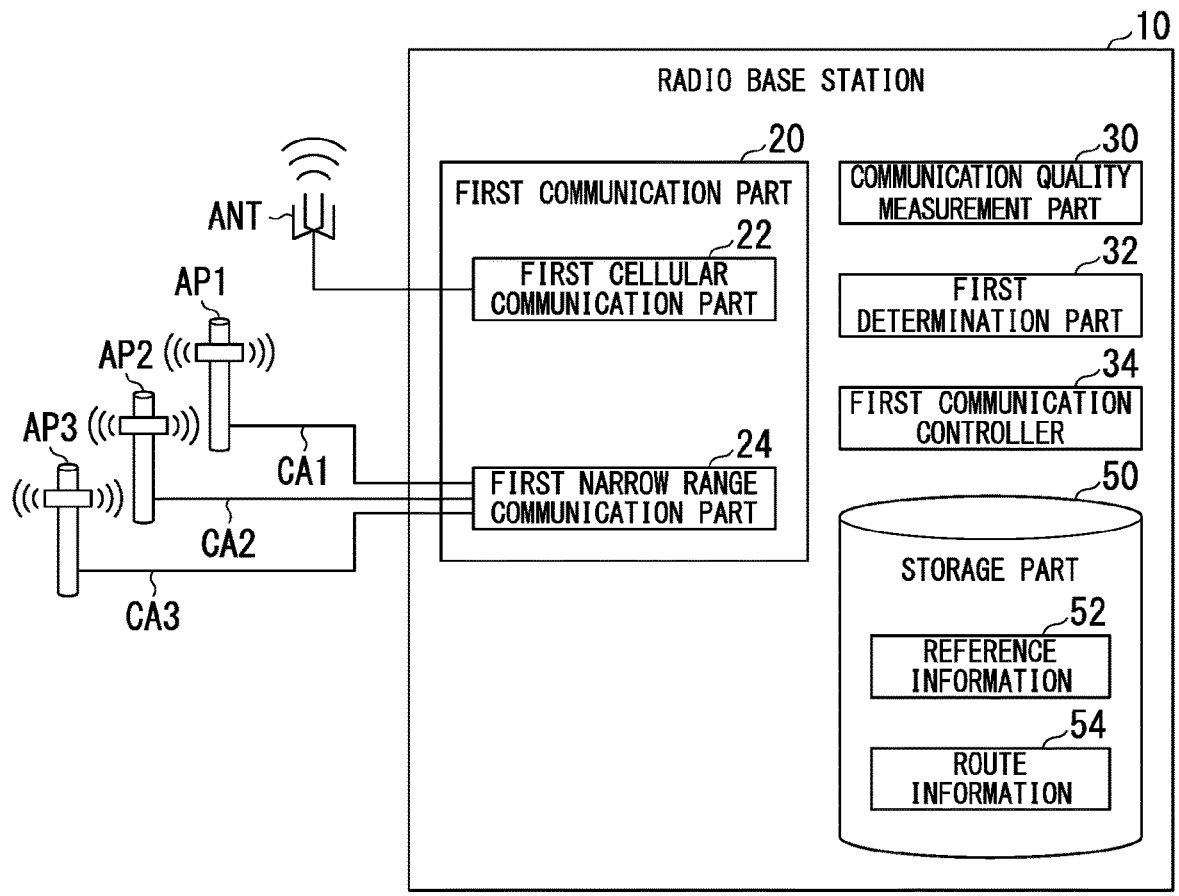
FIG. 2 is a configuration view of a radio base station of the first embodiment.
FIG. 3 is a view showing an example of contents of reference information.

FIG. 2 is a configuration view of the radio base station 10 of the first embodiment. The radio base station 10 is a wireless communication base station provided by a communication service provider, for example, eNodeB, gNodeB, or the like. The radio base station 10 includes, for example, a first communication part 20, a communication quality measurement part 30, a first determination part 32, a first communication controller 34 and a storage part 50. Further, there is no limitation to a configuration in which the radio base station 10 includes all of these functional parts, and an apparatus (not shown) for managing the radio base station 10 may include some or all of them (except the first communication part 20).

The first determination part 32 and the first communication controller 34 are realized by executing a program (software) using a hardware processor, for example, a central processing unit (CPU) or the like. In addition, some or all of these components may be realized by hardware (a circuit part; including circuitry) such as a large scale integration (LSI), an application specific integrated circuit (ASIC), a field-programmable gate array (FPGA), a graphics processing unit (GPU), or the like, or may be realized by cooperation of software and hardware. The program may have been previously stored in the storage part 50, or may be stored on a detachable storage medium such as a DVD, a CD-ROM, or the like, and installed in the storage part 50 when mounting such a storage medium on a drive device.

The storage part 50 is realized by, for example, a hard disk drive (HDD), a flash memory, an electrically erasable programmable read only memory (EEPROM), a read only memory (ROM), a random access memory (RAM), or the like. For example, reference information 52, route information 54, a program executed by being read by a processor, various other information, and the like, are stored in the storage part 50.

FIG. 3 is a view showing an example of contents of the reference information 52. The reference information 52 is information used when the first determination part 32 determines a communication priority level of transmission data. The reference information 52 is, for example, information in which identification information that enables identification of a transmission source device of transmission data, information showing a type of the transmission source device, information showing a type of transmission data transmitted by the transmission source device, and the information showing a communication priority level of the transmission data are associated with each other. The identification information that enables identification of the transmission source device is, for example, identification information recorded in a subscriber identity module (SIM) card used when wireless communication provided by the radio base station 10 is used, a terminal ID used when the wireless communication of the Wi-Fi network is used, or the like. Hereinafter, the case in which the identification information is both of the identification information recorded on a SIM card and a terminal ID will be described. For example, the reference information 52 is previously determined by a service provider that provides the communication system 1.

In FIG. 3, the type of the transmission source device is, for example, the vehicle M, an on-vehicle instrument mounted on the vehicle M, the communication device 100, a smartphone, a game machine, or the like. When the transmission source device is the vehicle M, the on-vehicle instrument mounted on the vehicle M, or the communication device 100, the transmission data transmitted from the transmission source device is, for example, vehicle information. When the transmission source device is a smartphone, the transmission data transmitted from the transmission source device is, for example, conversation information showing the voice of a conversation or content information to be reproduced on the smartphone. When the transmission source device is a game machine, the transmission data transmitted from the transmission source device is, for example, game information such as various types of data or the like used in a game.

In addition, in FIG. 3, a communication priority level is associated with each type of transmission data. The communication priority level is, for example, a communication priority level used in quality of service (QoS) related to a channel of wireless communication, and realized by a class of service (CoS) expressed by data of 3 bits in a virtual LAN (VLAN) tag of a media access control (MAC) frame, an inter-switch link (ISL) type CoS expressed by 8 steps using information of the lower 3 bits of a "user definition" field in an ISL header, ToS expressed by 8 steps using information (IP Precedence) of 3 bits of a "type of service (ToS)" field in the Internet protocol (IP) header, a DiffServ code point (DSCP) expressed by 64 steps using information of 6 bits when the "ToS" field in the IP header is redefined as the "DiffServ (DS)" field, or the like.

In the following description, the communication priority level is shown by values of "1" to "9." As the value of the communication priority level increases, the communication has increasing priority over other communication. For example, a communication priority level (in this case, "8") higher than that of the other vehicle information corresponds to the vehicle information used for control of the vehicle M, a communication priority level (in this case, "6") lower than the vehicle information used for control of the vehicle M and higher than the contents information corresponds to the vehicle information which is not used for control of the vehicle M and which is not the content information, and the communication priority level (in this case, "3") lower than that of the other vehicle information corresponds to the contents information in the vehicle information.

In addition, the communication priority level "8" corresponds to the call information, the communication priority level "4" corresponds to the contents information reproduced in a smartphone, and the communication priority level "2" corresponds to the game information. In addition, these communication priorities are exemplary and not limited thereto.

Further, as described above, while the case in which the same reference information 52 is used when the communication priority level of the communication using mobile communication network or the communication using the Wi-Fi network is determined has been described, but there is no limitation thereto. The reference information 52 may be determined in, for example, each communication network. For example, in the reference information 52 related to the mobile communication network and the reference information 52 related to the Wi-Fi network, different communication priority levels may be assigned to the same (the same type of) information. The reference information 52 with respect to the mobile communication network is previously determined by, for example, a service provider that provides a mobile communication network and the reference information 52 with respect to the Wi-Fi network is previously determined by, for example, a service provider that provides a Wi-Fi network. In the following description, a case in which the first determination part 32 determines a communication priority level for each type of transmission data on the basis of the same reference information 52 will be described.

Figures 4, 5:
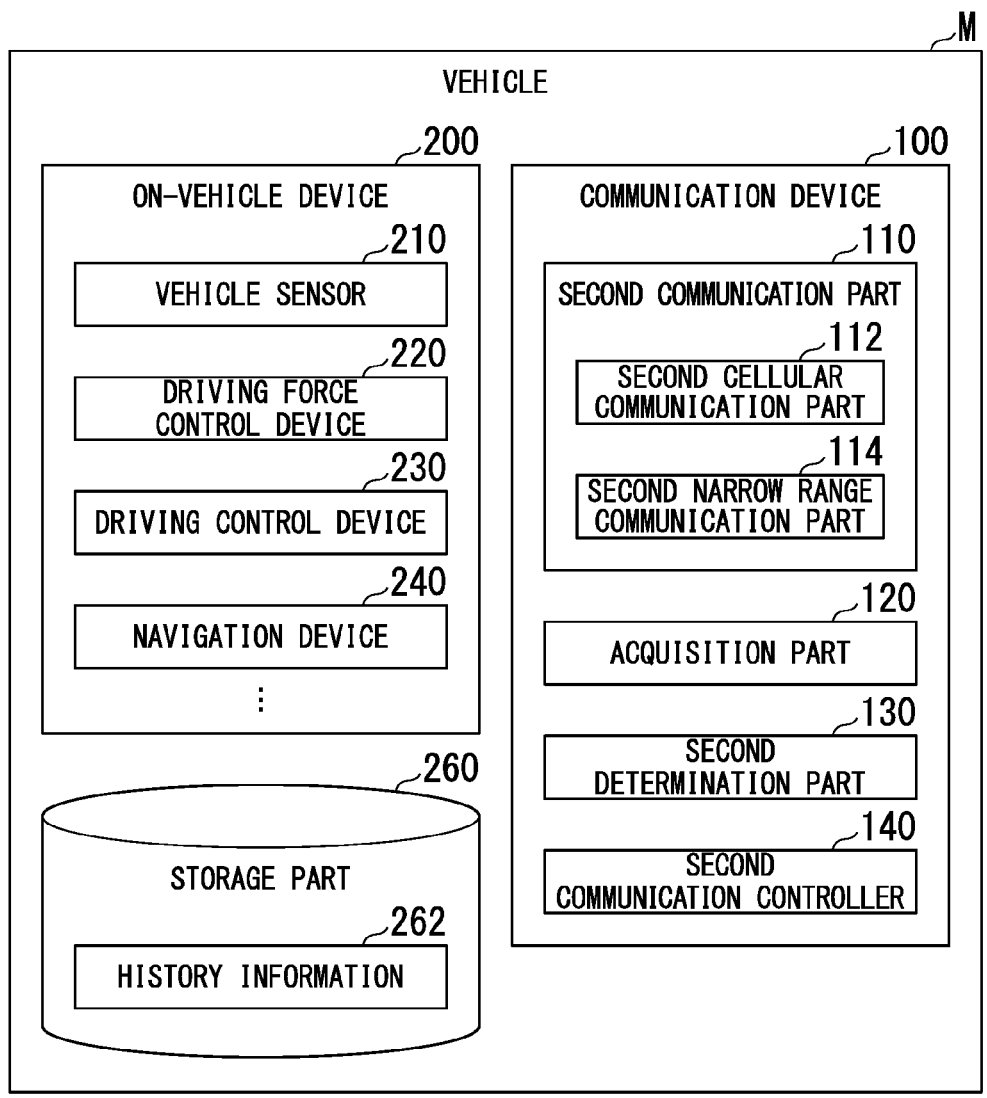
FIG. 4 is a view showing an example of contents of route information.
FIG. 5 is a configuration view of a vehicle including a communication device of the first embodiment.

FIG. 4 is a view showing an example of contents of the route information 54. The route information 54 is information used when the first determination part 32 determines which mobile communication network will be used to perform communication of the transmission data among the mobile communication networks provided by the radio base station 10 within the communication range A1 (in this case, 4G and 5G). For example, the route information 54 is information in which the information showing the mobile communication network provided by the radio base station 10 and the information showing the communication priority level are associated with each other.

On the basis of the route information 54 shown in FIG. 4, the radio base station 10 performs communication related to the transmission data associated with communication priorities of "1" to "4" in the mobile communication network of 4G. In addition, the radio base station 10 performs communication related to the transmission data to which communication priorities of "1" to "2" correspond in the communication band having a narrow bandwidth, and performs communication related to the transmission data to which communication priorities of "3" to "4" correspond in the communication band having a wide bandwidth in the mobile communication network of 4G. The radio base station 10 performs communication related to the transmission data to which communication priorities of "5" to "8" correspond in the mobile communication network of 5G. In addition, the radio base station 10 performs communication related to the transmission data to which communication priorities of "5" to "6" correspond in the communication band having a narrow bandwidth, and performs communication related to the transmission data to which communication priorities of "7" to "8" correspond in the communication band having a wide bandwidth in the mobile communication network of 5G.

Further, in the route information 54 of FIG. 4, while the case in which the communication priority level assigned to each mobile communication network is uniquely defined has been described, there is no limitation thereto. In the communication priority level assigned to each mobile communication network, for example, a range may be determined by a threshold or the like. In addition, the route information 54 may be information that differs at each radio base station 10. In addition, when the mobile communication network in which the radio base station 10 is provided in the communication range A1 is uniquely defined (for example, either 4G or 5G), the first determination part 32 may determine that the transmission data is to be communicated according to the mobile communication network that is uniquely determined, and the route information 54 may not be stored in the storage part 50.

Returning to FIG. 2, the first communication part 20 includes a first cellular communication part 22 and a first narrow range communication part 24. The first cellular communication part 22 performs wireless communication with the vehicle M (the communication device 100) present in the communication range A1 via an antenna ANT of the radio base station 10 on the basis of the control of the first communication controller 34. The first narrow range communication part 24 performs wireless communication with the vehicle M (the communication device 100) present in the communication range A2 via the access point AP connected by the cable CA on the basis of the control of the first communication controller 34. Here, the narrow range does not necessarily have to be a range smaller than the range provided by the first cellular communication part 22. The first narrow range communication part 24 may control a small cell of cellular communication as the access point AP or may control Wi-Fi as the access point AP. In the following description, the case in which the first narrow range communication part 24 controls the Wi-Fi network as the access point AP will be described.

The communication quality measurement part 30 measures a communication quality of the mobile communication network provided in the communication range A1 by the radio base station 10. In addition, the communication quality measurement part 30 measures each communication quality of the Wi-Fi network provided in the communication range A2 by the access point AP. The communication quality includes, for example, information related to a latency of the communication. The latency is one of indices in data communication. The latency includes, for example, a delay time of communication. In addition, the communication quality may be a throughput, a communication speed, a traffic load, a band use rate, the number of error packets, the number of lost packets, or the like.

The first determination part 32 determines which communication network is used to transmit the transmission data among the mobile communication network and the Wi-Fi network on the basis of the information showing the communication quality of the mobile communication network and the information showing the communication quality of the Wi-Fi network measured by the communication quality measurement part 30. For example, when the communication quality in the communication range A2 is better than that in the communication range A1, the first determination part 32 assumes that the vehicle M is present in the communication range A2 and determines to perform communication via the Wi-Fi network. In addition, when the communication quality of the communication range A1 is better than that in the communication range A2, the first determination part 32 assumes that the vehicle M is present in the communication range A1 and determines to perform communication by the mobile communication network.

Further, the first determination part 32 may determine that communication is performed using the communication network required by the communication device 100. Hereinafter, the first determination part 32 will be described as being able to communicate using the communication network required by the communication device 100.

In addition, the first determination part 32 determines the communication priority level assigned to the transmission data on the basis of the transmission data transmitted from the transmission source device, the reference information 52, and the information showing the communication quality of the communication network determined as being communicated. When the communication network determined to use is the mobile communication network, the first determination part 32 determines which of the 4G or 5G mobile communication network is used for the communication related to the transmission data on the basis of the determined communication priority level and the route information 54.

Here, there is a case in which the communication device 100, which will be described below, requests the radio base station 10 to communication with the external device TA regarding the transmission data by the communication priority level different from the communication priority level previously determined in the reference information 52. The different communication priority level is, for example, a communication priority level having higher level than the communication priority level related to the transmission data previously determined in the reference information 52. The first determination part 32 determines that the communication regarding the transmission data is performed by the communication priority level according to a request of a second communication part 110 when there is no influence on the other communication in the communication network in the case in which the communication regarding the transmission data is performed in accordance with the communication priority level required by the communication device 100 on the basis of the information showing the communication quality. In addition, the first determination part 32 determines that the communication regarding the transmission data is performed in accordance with the communication priority level previously determined in the reference information 52 when there is an influence on the other communication in the communication network.

Not affecting other communication is, for example, the latency, the throughput, the traffic load, the band use rate, the number of error packets, the number of lost packets, or the like, being equal to or less than a predetermined threshold, or the communication speed or the like being equal to or more than a predetermined threshold, when the communication device 100 and the external device TA perform communication regarding the transmission data. Affecting the other communication includes, for example, making the latency, the traffic load, the number of error packets, the band use rate, or the like, larger than the predetermined threshold, or making the communication speed or the like less than the predetermined threshold, when the communication device 100 and the external device TA perform communication regarding the transmission data.

Further, the predetermined threshold may be set to each of the latency, the throughput, the communication speed, the traffic load, the band use rate, the number of error packets, the number of lost packets, and the like, and the first determination part 32 may determine whether other communication is affected by comparing the measurement results of the communication quality measurement part 30 with each of the predetermined threshold. In this case, the first determination part 32 may determine that communication regarding the transmission data is performed according to the previously determined communication priority level in the reference information 52 when it is determined that any one of the latency, the throughput, the communication speed, the traffic load, the band use rate, the number of error packets, and the number of lost packets in the measurement results of the communication quality measurement part 30 affects the other communication, and may determine that communication regarding the transmission data is performed by the previously determined communication priority level in the reference information 52 when it is determined that the measurement results of the predetermined number or more affect the other communication.

In addition, the first determination part 32 may determine that communication regarding the transmission data is performed according to the previously determined communication priority level in the reference information 52 when a previously determined combination (for example, the throughput and the number of error packets, or the like) among the latency, the throughput, the communication speed, the traffic load, the band use rate, the number of error packets and the number of lost packets, which are the measurement results of the communication quality measurement part 30, is determined to affect the other communication.

The first communication controller 34 causes the first communication part 20 to perform communication related to the transmission data transmitted from the transmission source device by the communication using the mobile communication network based on the determination of the first determination part 32. Specifically, the first communication controller 34 performs priority control in QoS of the communication priority level based on determination of the first determination part 32 through communication using the mobile communication network, and transmits the information including the determination results showing that the transmission source device and the target instrument communicate with each other to the transmission source device using the first cellular communication part 22. Alternatively, the first communication controller 34 performs priority control of the QoS of the communication priority level based on the determination of the first determination part 32 through communication using the Wi-Fi network, and transmits the information including the determination results showing that the transmission source device and the target instrument communicate with each other to the transmission source device using the first narrow range communication part 24.

Then, the first communication controller 34 causes the first communication part 20 to perform communication related to the transmission data by an absolute priority system, a weighted round-robin system, a delay guarantee round-robin system, shaving, or the like, on the basis of the communication priority level assigned to the transmission data according to the response of the radio base station 10 or the access point AP by the transmission source device. The absolute priority system is a QoS priority control system in which the transmission data with a high communication priority level has an absolute priority over the transmission data with a low communication priority level. A weighted round-robin system is a QoS priority control system configured to transmit transmission data according to a proportion of an amount of transmission data with an assigned communication priority level or a maximum amount of transmission data. The delay guarantee round-robin system is a QoS priority control system configured to transmit the transmission data according to a maximum transmission delay time set to each of the communication priorities.

Further, the first communication controller 34 may perform the communication related to the transmission data according to the communication priority level determined by the first determination part 32 in at least a part of the communication route from the vehicle M to the external device TA.

[On-Vehicle Device]

Next, the vehicle M including the communication device 100 will be described. FIG. 5 is a configuration view of the vehicle M including the communication device 100 of the first embodiment. In the example of FIG. 5, components of the vehicle M used in processing executed by the communication system 1 of the first embodiment will be mainly described. The vehicle M includes, for example, the communication device 100, an on-vehicle device 200, and a storage part 260.

The on-vehicle device 200 includes, for example, a vehicle sensor 210, a driving force control device 220, a driving control device 230, and a navigation device 240. The vehicle sensor 210, the driving force control device 220, the driving control device 230 and the navigation device 240 are examples of "the on-vehicle instrument."

The vehicle sensor 210 includes, for example, an accelerator position sensor, a vehicle speed sensor, a brake depression amount sensor, and the like. The accelerator position sensor is assigned to an accelerator pedal (an example of an operator) configured to receive an acceleration instruction from a driver in the vehicle M, detects an operation amount of the accelerator pedal, and outputs the detected operation amount to the driving force control device 220 as an accelerator position. The vehicle speed sensor includes, for example, a wheel speed sensor and a speed calculator assigned to each of the wheels, combines the wheel speeds detected by the wheel speed sensors to derive a speed of the vehicle M (a vehicle speed), and outputs the derived vehicle speed to the driving force control device 220. The brake pedaling sensor is assigned to the brake pedal (an example of the operator) configured to receive a deceleration or stopping instruction from a driver, detects an operation amount of the brake pedal, and outputs the detected operation amount to the driving force control device 220 as brake pedal depression amount.

In addition, the vehicle sensor 210 includes a vehicle speed sensor configured to detect a speed of the vehicle M, an acceleration sensor configured to detect an acceleration, a yaw rate sensor configured to detect an angular speed around a vertical axis, an azimuth sensor configured to detect an orientation of the vehicle M, and the like.

In addition, the vehicle sensor 210 may include, for example, a camera, a radar device, a light detection and ranging (LIDAR) device, an object recognition device, or the like. These components are components configured to detect surroundings information of the vehicle M. The camera is, for example, a digital camera using a solid state image sensing device such as a charge coupled device (CCD), a complementary metal oxide semiconductor (CMOS), or the like. The camera may be a stereo camera. The camera is assigned to an arbitrary place on the vehicle M. When a side in front of the vehicle is imaged, the camera is assigned to an upper section of a front windshield, a back surface of a rearview mirror, or the like. The camera images the surroundings of the vehicle M, for example, periodically and repeatedly.

The radar device radiates radio waves such as millimeter waves or the like to the surroundings of the vehicle M and detects the radiowaves reflected by an object in the surroundings (reflected waves) to detect at least a position of the object (a distance and an azimuth). The radar device is assigned to an arbitrary place on the vehicle M. The radar device may detect a position and a speed of an object using, for example, a frequency modulated continuous wave (FM-CW) method.

The LIDAR radiates light to the surroundings of the vehicle M (or electromagnetic waves having a wavelength close to light) and measures scattered light. The LIDAR detects a distance to a target on the basis of a time from light emission to light reception. The radiated light is, for example, a pulse-shaped laser beam. The LIDAR is assigned to an arbitrary place on the vehicle M.

The object recognition device performs sensor fusion processing with respect to the detection results from some or all of the above-mentioned camera, radar device, and LIDAR, and recognizes a position, a type, a speed, or the like, of the object around the vehicle M. The object recognition device outputs the recognition results to the driving control device 230. In addition, the object recognition device may output the detection result of the camera, the radar device, and the LIDAR to the driving control device 230 as they are. In this case, the object recognition device may be omitted from the vehicle M.

The driving force control device 220 is a device configured to provide a driving force or the like to the vehicle M to allow the vehicle M to travel. The driving force control device 220 includes, for example, a traveling driving force output device configured to output a traveling driving force (torque) for traveling of the vehicle M as a driving force to the driving wheels, and a brake device configured to output a brake torque according to a predetermined braking operation to each of the wheels, and a steering device configured to change an orientation of the steered wheel.

The traveling driving force output device includes, for example, a combination of the internal combustion engine, an electric motor, a gearbox, and the like, and an electronic control unit (ECU) configured to control these. The components are controlled according to the information input from the driving control device 230 or the information input from the driving operators (the steering wheel, the accelerator pedal, the brake pedal, or the like). The brake device includes, for example, a brake caliper, a cylinder configured to transmit a hydraulic pressure to the brake caliper, an electric motor configured to generate a hydraulic pressure in the cylinder, and a brake ECU. The brake ECU controls the electric motor according to the information input from the driving control device 230 or the information input from the driving operator, and outputs the brake torque to each of the wheels according to a braking operation. The brake device may include a mechanism configured to transmit a hydraulic pressure generated by an operation of the brake pedal included in the driving operator to the cylinder via the master cylinder as a back-up. Further, the brake device is not limited to the above-mentioned configuration, and may be an electronically controlled hydraulic brake device configured to control an actuator according to the information input from the driving control device 230 and transmit the hydraulic pressure in the master cylinder to the cylinder.

The steering device includes, for example, a steering ECU and an electric motor. For example, the electric motor changes an orientation of the steered wheel by applying a force to a rack and pinion mechanism. The steering ECU drives the electric motor and changes the orientation of the steered wheel according to the information input from the driving control device 230 or the information input from the driving operator.

The driving control device 230 performs, for example, automatic driving (autonomous driving) control, driving assistance control, or the like, of the vehicle M. For example, the automatic driving control controls one or both of steering or a speed of the vehicle M regardless of a driving operation by an occupant of the vehicle M. In addition, the driving assistance control is, for example, driving control of assisting a driving operation of an occupant of an adaptive cruise control system (ACC), a lane keeping assistance system (LKAS), a collision mitigation brake system (CMBS), or the like. For example, the driving control device 230 generates driving control contents corresponding to a surroundings situation of the vehicle M detected by the vehicle sensor 210, a behavior of the vehicle M, or a control instruction from an occupant, and outputs the generated driving control contents to the driving force control device 220 to drive the devices. Here, the driving control device 230 may perform automatic driving control, driving assistance control, or the like, on the basis of the instruction from the external device TA, and may perform automatic driving control, driving assistance control, or the like, with reference to the information acquired from the external device TA.

The navigation device 240 includes, for example, a global navigation satellite system (GNSS) receiver, a navigation human machine interface (HMI), and a route determination part. The navigation device 240 stores map information in a storage device such as an HDD, a flash memory, or the like. The GNSS receiver specifies a position of the vehicle M on the basis of the signal received from GNSS satellites. The position of the vehicle M may be identified or corrected by an inertial navigation system (INS) using an output of the vehicle sensor 210 mounted on the vehicle M. Here, the navigation device 240 may be operated on the basis of an instruction from the external device TA, or may be executed with reference to the information acquired from the external device TA.

The navigation HMI includes a display, a speaker, a touch panel, a key, and the like. The navigation HMI allows an occupant to set a destination or the like using an image, sound, or the like, or guides an occupant to a destination via a traveling route. The route determination part determines, for example, the route (hereinafter, a route on a map) from the position of the vehicle M (or an input arbitrary position) specified by the GNSS receiver to the destination input by the occupant using the navigation HMI with reference to map information. The map information is, for example, information representing a road shape using links showing a road and nodes connected by the links. The map information includes a curvature of a road, point of interest (POI) information, or the like. In addition, the map information may include, for example, information on a center of a lane, information on a boundary of a lane, information on types of lanes, or the like. In addition, the map information includes road information, traffic regulation information, address information (address/zip code), facility information, telephone number information, and the like. The map information may be updated at any time by allowing the communication device 100 to communicate with other devices. The navigation device 240 performs route guidance or the like according to a map image display of the display part and sound output by a speaker (not shown) on the basis of a route on a map.

Further, the on-vehicle device 200 may include, in addition to the above-mentioned devices, at least one of, for example, an audio device, a battery management device, a keyless entry system, a suspension system, an airbag device, a door lock device, a door opening/closing device, a window opening/closing device, a seat position control device, a rearview mirror angular position control device, a vehicle inside/outside lighting control device, a control device for a wiper or a defogger, a turn signal control device, and an air-conditioning device. Here, the on-vehicle device 200 may be executed on the basis of the instruction from the external device TA, or may execute functions thereof with reference to the information acquired from the external device TA. For example, the audio device may request music, broadcasting information, or the like from the external device TA, and may acquire content information such as music, broadcasting information, or the like, from the external device TA and output the acquired content. In this case, the driving control device 230 preferably sets a communication priority level which is relatively smaller than the communication priority level upon transmission and reception to/from the other external device TA.

The communication device 100 includes, for example, the second communication part 110, an acquisition part 120, a second determination part 130 and a second communication controller 140. The components of the communication device 100 are realized by executing a program (software) using a hardware processor such as a CPU or the like. In addition, some or all of these components may be realized by hardware (including a circuit part) such as an LSI, an ASIC, an FPGA, a GPU, or the like, or may be realized by cooperation of software and hardware. The program may be previously stored in the storage part 260, may be stored on a detachable storage medium such as a DVD, a CD-ROM, or the like, or may be installed in the storage part 260 by mounting the storage medium in the drive device. Some or all of the components of the communication device 100 are examples of a telematics control unit (TCU).

Further, the communication device 100 may include a part of the above-mentioned function part. For example, the second communication part 110 may be provided in a terminal device including a communication function such as a smart phone or the like outside the communication device 100. In this case, the second communication controller 140 controls an operation of the second communication part 110 provided in a communication terminal.

The storage part 260 is realized by, for example, an HDD, a flash memory, an EEPROM, a ROM, a RAM, or the like. For example, history information 262, a program realized by being read by a processor, other various pieces of information, or the like, are stored in the storage part 260.

FIG. 6 is a view showing an example of contents of the history information 262. As described above, the communication device 100 performs communication related to the external device TA and the vehicle information with the communication priority level when the communication with the external device TA with the communication priority level required by the radio base station 10 or the access point AP is accepted. The history information 262 is, for example, information in which the identification information of the communication network and the information showing the communication priority level accepted by the radio base station 10 or the access point AP correspond to each other so far. The identification information of the communication network is, for example, information that enables identification of the mobile communication network provided by the radio base station 10, or information that enables identification of the Wi-Fi network (for example, a service set identifier (SSID) or the like).

The second communication part 110 includes a second cellular communication part 112 and a second narrow range communication part 114. The second cellular communication part 112 communicates with the radio base station 10 or the other vehicles present around the vehicle M using a cellular network on the basis of the control of the second communication controller 140. The cellular network is a mobile communication network of 3G, 4G, 5G, or the like, provided in the communication range A1 by the radio base station 10. The second narrow range communication part 114 communicates with the access point AP or the other vehicles present around the vehicle M using the Wi-Fi network on the basis of the control of the second communication controller 140. The Wi-Fi network is a communication network provided in the communication range A2 by the access point AP.

The acquisition part 120 acquires, for example, information obtained from each on-vehicle instrument provided in the on-vehicle device 200 as vehicle information. The vehicle information includes, for example, information detected by the vehicle sensor 210, control data by the driving force control device 220, control data by the driving control device 230, navigation information by the navigation device 240 (for example, destination information or route guide information to a destination), or the like.

The second determination part 130 determines a communication priority level assigned to the vehicle information acquired by the acquisition part 120 on the basis of the communication result with the radio base station 10 via the mobile communication network by the second cellular communication part 112, the communication result with the access point AP via the Wi-Fi network by the second narrow range communication part 114, and the history information 262.

First, the second determination part 130 determines which communication network is used to communicate the transmission data among the mobile communication network and the Wi-Fi network on the basis of the communication quality of the mobile communication network and the communication quality of the Wi-Fi network. The second determination part 130 acquires, for example, the communication quality of the mobile communication network according to the communication result with the radio base station 10 via the mobile communication network by the second cellular communication part 112. In addition, the second determination part 130 acquires, for example, the communication quality of the Wi-Fi network according to the communication result with the access point AP via the Wi-Fi network by the second narrow range communication part 114. Since the communication quality has the same contents as the communication quality measured by the communication quality measurement part 30, description thereof will be omitted. The second determination part 130 determines, for example, to transmit the vehicle information using the communication network with a good communication quality.

Next, the second determination part 130 determines whether a communication has been previously performed with the determined communication network in the past and whether the communication priority level related to the communication has been determined on the basis of the history information 262. The second determination part 130 acquires, for example, the identification information of the determined communication network using the second communication part 110, and retrieves the history information 262 using the acquired identification information as a retrieval key. The second determination part 130 considers that the communication with the determined communication network was performed in the past when the communication priority level is associated with the identification information as the retrieved result, and determines the communication priority level of the retrieved result as the communication priority level related to the communication.

Meanwhile, the second determination part 130 considers that the communication with the determined communication network has not been performed in the past when the communication priority level is not associated with the identification information which is the retrieval key as the retrieved result, and determines an appropriate communication priority level corresponding to the vehicle information. The second determination part 130 may determine, for example, that the highest communication priority level is assigned to the vehicle information, or may determine the communication priority level previously determined on each type of the vehicle information as the communication priority level assigned to the vehicle information. The second determination part 130 determines an appropriate communication priority level according to the vehicle information, which is an example of "dynamically determining the communication priority level."

In addition, the second determination part 130 performs processing of determining which one of the mobile communication network and the Wi-Fi network is used to communicate the transmission data on the basis of the communication quality of the mobile communication network and the communication quality of the Wi-Fi network when the communication network used by the vehicle M is changed. The case in which the communication network in which the vehicle M is present is changed is the case in which a change occurs in any one of the communication quality obtained by the communication result of the second cellular communication part 112 and the communication quality obtained by the communication result of the second narrow range communication part 114. Since the processing that determines the communication network is the same as the above-mentioned processing, description thereof will be omitted.

The second communication controller 140 causes the second communication part 110 to transmit the transmission data including the information showing the communication priority level determined by the second determination part 130 and the vehicle information acquired by the acquisition part 120 to the radio base station 10. In the following description, the fact that the second communication controller 140 controls the second communication part 110 and makes the second communication part 100 to transmit the transmission data to a transmission destination is also described as "the second communication controller 140 transmits the data."

In general, a data quantity (a transmission unit) that can be transmitted at once in the network is previously determined, and the second communication controller 140 divides the vehicle information into data quantities that can be transmitted at once, and transmits the divided data quantities to the radio base station 10 or the access point AP. In this case, the second communication controller 140 transmits the information showing the communication priority level firstly determined by the second determination part 130 to the radio base station 10 through bearer communication before transmission of the divided transmission data is started, or transmits the information to the access point AP through communication via the Wi-Fi network. Accordingly, the second communication controller 140 requires the radio base station 10 or the access point AP to perform communication in accordance with the communication priority level determined by the second determination part 130.

The first determination part 32 determines the communication priority level of the mobile communication network or the communication priority level of the Wi-Fi network related to the communication of the transmission data on the basis of the transmission data transmitted by the second communication controller 140. The first communication controller 34 transmits the information including the determination result of the first determination part 32 to the communication device 100 as a response with respect to the request.

The second communication controller 140 transmits the divided transmission data to the external device TA in sequence according to the communication based on the communication priority level determined by the first determination part 32.

[Processing Sequence]

Figure 7:
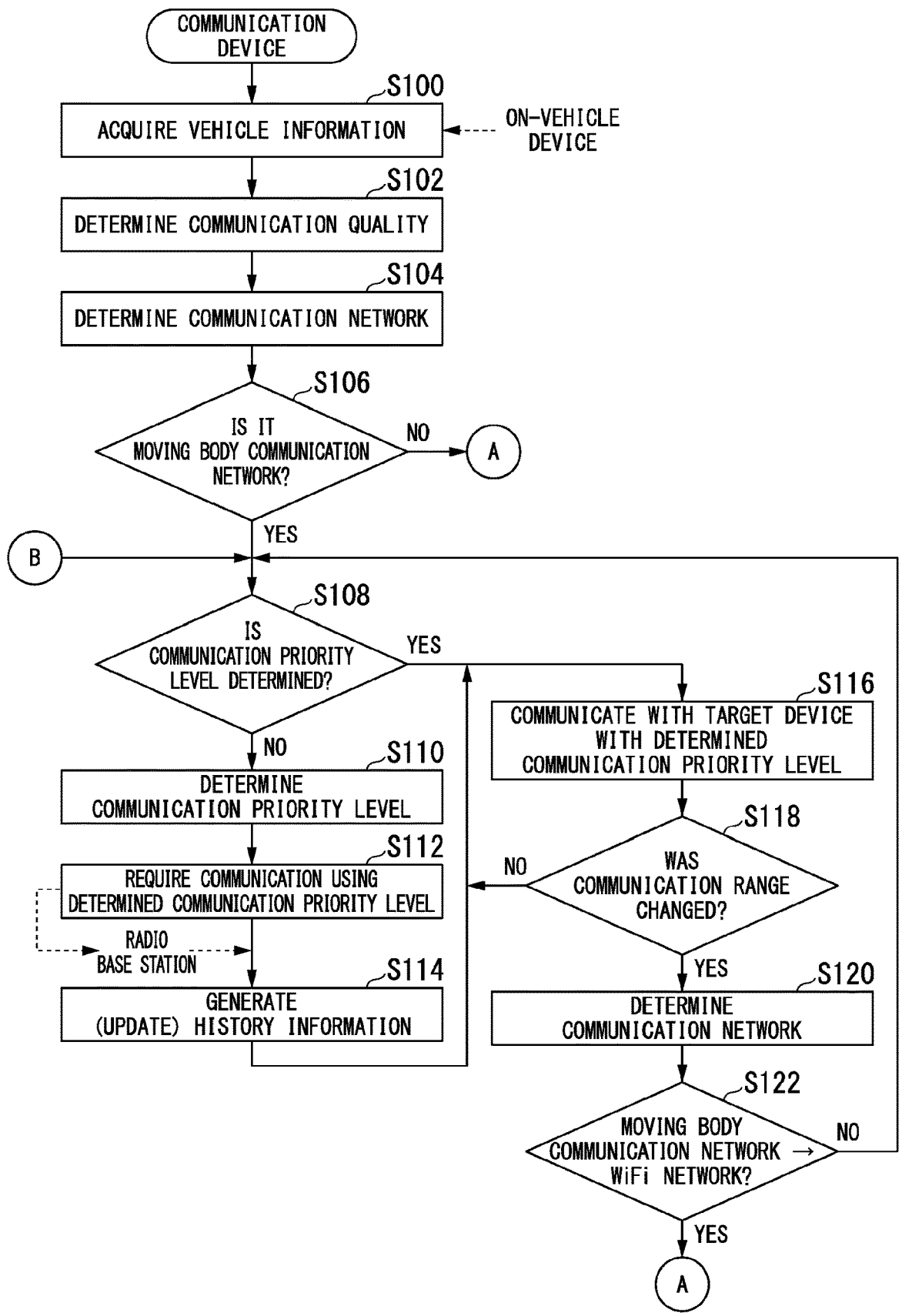
FIG. 7 is a flowchart showing an example of processing executed by the communication system according to the first embodiment.
Figure 8:
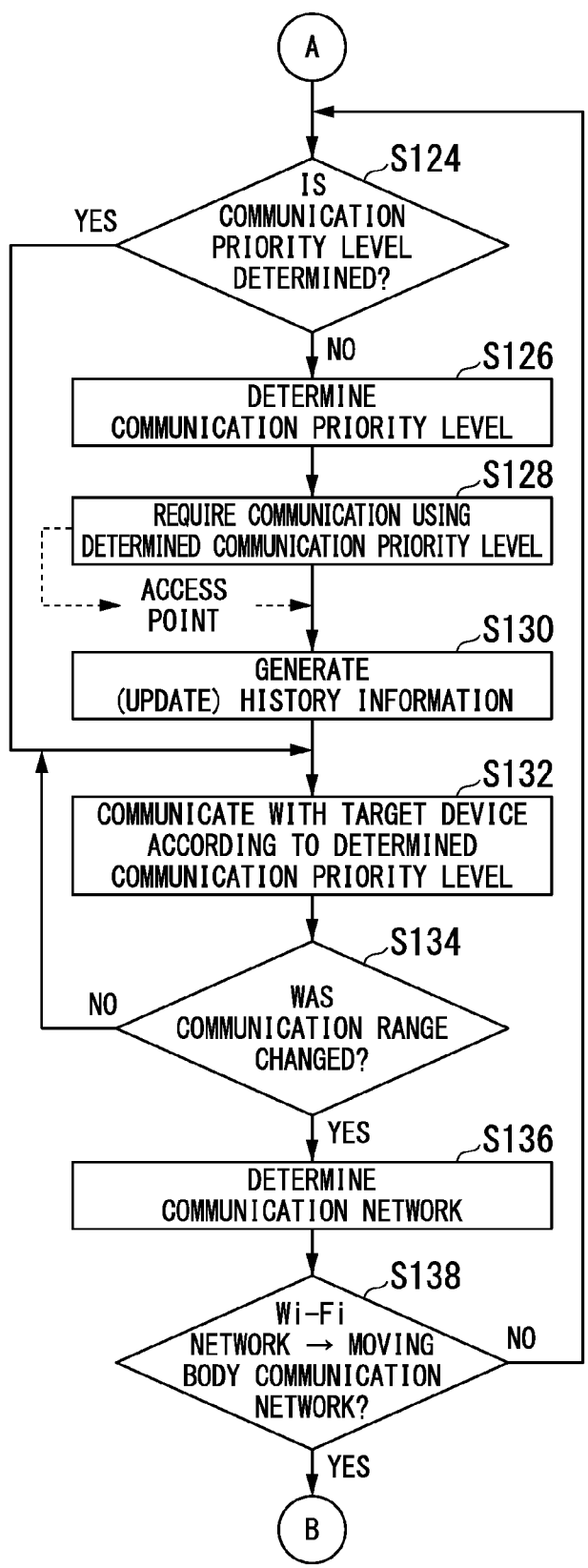
FIG. 8 is a flowchart showing an example of processing executed by the communication system according to the first embodiment.

FIG. 7 and FIG. 8 are flowcharts showing an example of processing executed by the communication system 1 according to the first embodiment. First, the acquisition part 120 of the communication device 100 acquires vehicle information from the on-vehicle device 200 (step S100). The second communication part 110 acquires the communication quality of the communication range A1 of the radio base station 10 that enables communication at a position of the vehicle M, and the communication quality of the communication range A2 of the access point AP (step S102). The second determination part 130 determines whether which one of the mobile communication network and the Wi-Fi network is used to communicate the transmission data on the basis of the information showing the communication quality of the mobile communication network acquired by the second communication part 110 and the information showing the communication quality of the Wi-Fi network (step S104). The second determination part 130 is determined to perform communication using, for example, the communication network with a good communication quality.

Next, the second determination part 130 determines whether the determined communication network is a mobile communication network (step S106). The second determination part 130 advances the processing to step S124 when the determined communication network is the Wi-Fi network.

The second determination part 130 determines whether the communication priority level is already determined with respect to the determined mobile communication network on the basis of the history information 262 (step S108). The second determination part 130 acquires the identification information of the determined mobile communication network using, for example, the second communication part 110, and retrieves the history information 262 using the acquired identification information as a retrieval key. The second determination part 130 considers that the communication priority level with respect to the determined mobile communication network is already determined when it is judged that a communication priority level is associated with the identification information as a result of the retrieve, and advances the processing to step S116. The second determination part 130 considers that a communication with the determined mobile communication network has not been performed in the past when it is judged that the communication priority level is not associated with the identification information as a result of the retrieve, and determines an appropriate communication priority level according to the vehicle information (step S110).

The second communication controller 140 first transmits the information showing the communication priority level determined by the second determination part 130 to the radio base station 10 through bearer communication (step S112). Accordingly, the communication device 100 requests the radio base station 10 for communication in accordance with the communication priority level determined by the second determination part 130.

The first determination part 32 of the radio base station 10 determines the communication priority level assigned to the transmission data on the basis of the transmission data transmitted from the transmission source device (in this case, the communication device 100), the reference information 52, and the information showing the communication quality of the communication network. Specifically, in the case in which the communication regarding the transmission data is performed in accordance with the communication priority level required by the communication device 100 on the basis of the information showing the communication quality, the first determination part 32 determines that the communication regarding the transmission data is performed in accordance with the communication priority level according to the request of the second communication part 110 when there is no influence on the other communication in the communication network. In addition, the first determination part 32 determines that the communication regarding the transmission data is performed in accordance with the communication priority level previously determined in the reference information 52 when there is an influence on the other communication in the communication network.

The first communication controller 34 performs priority control of the QoS of the communication priority level based on the determination of the first determination part 32 through communication using the communication network based on the determination of the first determination part 32, and transmits the information including the determination result, which showing so as to make the transmission source device and the target instrument communicate with each other, to the transmission source device (in this case, the communication device 100).

The second communication controller 140 generates a record in which the information showing the communication priority level determined by the radio base station 10 and the identification information of the mobile communication network provided by the radio base station 10 are associated with each other, and generates (updates) the history information 262 (step S114). Next, the second communication controller 140 transmits the divided transmission data to the external device TA in sequence through communication based on the communication priority level determined by the radio base station 10 (step S116).

The second determination part 130 determines whether the communication network (the communication range A1 or the communication range A2) communicating with the vehicle M has changed at predetermined time intervals (step S118). The second determination part 130 determines that the communication network in communication with the vehicle M is changed, for example, when a change occurs in any one of the communication quality obtained by the communication result of the second cellular communication part 112 and the communication quality obtained by the communication result of the second narrow range communication part 114 (for example, at the positions P1 to P5 shown in FIG. 1).

The second determination part 130 advances the processing to step S116 when it is determined that the communication network in communication with the vehicle M is not changed. The second determination part 130 determines which of one communication network of the mobile communication network and the Wi-Fi network is used to communicate the transmission data on the basis of the communication quality of the mobile communication network and the communication quality of the Wi-Fi network when it is determined that the communication network in communication with the vehicle M is changed (step S120).

The second determination part 130 determines whether the communication of the vehicle M is changed from the communication using the mobile communication network to the communication using the Wi-Fi network according to the determination in step S120 (step S122). The second determination part 130 advances the processing to step S108 when it is determined that the communication of the vehicle M is continuously performed using the mobile communication network. In addition, the second determination part 130 advances the processing to step S124 when it is determined that the communication of the vehicle M is switched from the communication using the mobile communication network to the communication using the Wi-Fi network.

The second determination part 130 determines whether the communication priority level with respect to the determined Wi-Fi network is already determined on the basis of the history information 262 (step S124). The second determination part 130 acquires the identification information of the determined Wi-Fi network using, for example, the second communication part 110, and retrieves the history information 262 using the acquired identification information as a retrieval key. The second determination part 130 considers that the communication priority level with respect to the determined Wi-Fi network is already determined when it is judged that the communication priority level is associated with the identification information as a result of the retrieve, and advances the processing to step S132. The second determination part 130 considers that the communication with the determined Wi-Fi network has not been performed in the past when it is judged that the communication priority level is not associated with the identification information as a result of the retrieve, and determines the appropriate communication priority level according to the vehicle information (step S126).

The second communication controller 140 first transmits the information showing the communication priority level determined by the second determination part 130 to the access point AP (step S128). Accordingly, the communication device 100 requests the radio base station 10, to which the access point AP is connected, for the communication by the communication priority level determined by the second determination part 130 via the access point AP. Since the processing of determining the communication priority level of the communication using the Wi-Fi network in the radio base station 10 is the same as the processing of determining the communication priority level of the communication using the mobile communication network in the radio base station 10, description thereof will be omitted.

The second communication controller 140 generates a record in which the information showing the communication priority level determined by the access point AP and the identification information of the Wi-Fi network provided by the access point AP are associated with each other, and generates (updates) the history information 262 (step S130). Next, the second communication controller 140 transmits the divided transmission data to the external device TA in sequence according to the communication based on the communication priority level determined by the access point AP (step S132).

The second determination part 130 determines whether the communication network in communication with the vehicle M at each predetermined time interval (the communication range A1 or the communication range A2) is changed (step S134). The second determination part 130 determines that the communication network in communication with the vehicle M was changed, for example, when a change occurs in any one of the communication quality obtained by the communication result of the second cellular communication part 112 and the communication quality obtained by the communication result of the second narrow range communication part 114 (for example, at the positions P1 to P5 shown in FIG. 1).

The second determination part 130 advances the processing to step S132 when it is determined that the communication network in communication with the vehicle M is not changed. The second determination part 130 determines which one communication network of the mobile communication network and the Wi-Fi network is used to communicate the transmission data on the basis of the communication quality of the communication range A1 obtained by the communication result with the radio base station 10 via the mobile communication network by the second cellular communication part 112 and the communication quality of the communication range A2 obtained by the communication result with the access point AP via the Wi-Fi network by the second narrow range communication part 114 when it is determined that the communication network in communication with the vehicle M is changed (step S136).

The second determination part 130 determines whether the communication of the vehicle M is switched from the communication using the Wi-Fi network to the communication using the mobile communication network according to the determination in step S136 (step S138). The second determination part 130 advances the processing to step S124 when it is determined that the communication of the vehicle M is continuously performed using the Wi-Fi network. In addition, the second determination part 130 advances the processing to step S108 when it is determined that the communication of the vehicle M is switched from the communication using the Wi-Fi network to the communication using the mobile communication network.

[With Respect to Band Control]

Further, as described above, while the case in which the first determination part 32 determines a communication priority level used for priority control of the QoS has been described, there is no limitation thereto. For example, the first determination part 32 may determine the band related to the band control of the QoS instead of (or in addition to) processing of determining the communication priority level used for the priority control of the QoS.

FIG. 9 is a view showing an example of contents of the reference information 52a used when the first determination part 32 determines a communication band. The reference information 52a is, for example, information in which the identification information that enables identification of the transmission source device of the transmission source of the data, information showing a type of the transmission source device, the information showing a type of the transmission data transmitted from the transmission source device, and the information showing the communication band of the communication network used for the communication of the transmission data, are associated with each other.

The first determination part 32 determines a communication network used for communication of the transmission data and a communication band in the communication network on the basis of the transmission data transmitted from the transmission source device, the reference information 52a, and the information showing the communication quality of each of the communication networks measured by the communication quality measurement part 30. In the reference information 52a of FIG. 9, for example, a communication band having a larger capacity than that in the other vehicle information is associated with the vehicle information used for control of the vehicle M, a communication band having a smaller capacity than in the vehicle information used for control of the vehicle M is associated with the vehicle information not used for control of the vehicle M and not the contents information, and a communication band having a lower speed and a lower capacity than in the other vehicle information is associated with the contents information among the vehicle information.

Further, the reference information 52a may include information showing a communication band with no band guarantee or no band limitation instead of (or in addition to) the information showing the communication band with a narrow bandwidth, or may include information showing a communication band with a band guarantee or a band limitation instead of (or in addition to) the information showing the communication band with a wide bandwidth. In addition, the reference information 52a may be further associated with which one cellular network of the 4G and 5G mobile communication networks is used. In this case, the route information 54 may not be stored in the storage part 50.

In addition, for example, the second determination part 130 may determine a band related to the band control of the QoS instead of (or in addition to) processing of determining the communication priority level used for priority control of the QoS. In this case, instead of (in addition to) the communication priority level, information showing the communication band used for the communication of the transmission data is included in the history information 262. Since processing of determining the communication band of the communication network using the second determination part 130 on the basis of the history information 262 is the same as the above-mentioned processing of determining the communication network using the second determination part 130 on the basis of the history information 262, description thereof will be omitted. Accordingly, the first determination part 32 can facilitate communication of the vehicle information according to a band with a band guarantee.

[Determination of Communication Priority Level Based on Traveling Information of Vehicle M]

Further, as described above, while the case in which the second determination part 130 determines the communication priority level on the basis of the type of the vehicle information has been described, there is no limitation thereto. The vehicle information includes, for example, status information showing a traveling state of the vehicle M, and the second determination part 130 may determine the communication priority level of the vehicle information on the basis of the status information. The second determination part 130 may determine that a high communication priority level is not assigned to the vehicle information used for control of the vehicle M, for example, when the status information shows that automatic driving control is not performed in the vehicle M. In addition, the second determination part 130 may determine that the high communication priority level is not assigned to the vehicle information that is image data imaged by the camera because the camera of the vehicle M cannot appropriately image the ambient environment of the vehicle M when the status information shows that the ambient environment in which the vehicle M travels is a bad environment (for example, rainfall, snowfall, heavy fog, or the like). In addition, the second determination part 130 may determine that the high communication priority level is not assigned to the vehicle position information in the vehicle information because changes (left and right turns, merging of lanes, or the like) in an ambient environment in which the vehicle M travels are unlikely to occur when the status information shows that the vehicle M is traveling on the highway. Accordingly, the second determination part 130 can more preferentially communicate the vehicle information according to the situation of the vehicle M than the other information.

[Re-Request of Communication Priority Level]

In addition, as described above, while the case in which the second communication controller 140 transmits the transmission data to the external device TA through communication based on the communication priority level determined by the radio base station 10 or the access point AP when the communication according to the communication priority level determined by the second determination part 130 is required to the radio base station 10 or the access point AP and the request was not accepted, have been described, there is no limitation thereto. The second communication controller 140 may cancel transmission of the transmission data, for example, when the request of the communication priority level was not accepted, and after a predetermined time, may require the radio base station 10 or the access point AP to perform communication in accordance with the communication priority level determined by the second determination part 130 again.

The second communication controller 140 transmits the transmission data to the external device TA through the communication based on the communication priority level determined by the radio base station 10 or the access point AP when the request after a predetermined time is accepted. The second communication controller 140 may perform repeatedly the processing of requesting the radio base station 10 or the access point AP for communication according to the communication priority level determined by the second determination part 130 again after a predetermined time until the request is accepted when the request was not accepted. In addition, the second communication controller 140 transmits the transmission data to the external device TA through communication based on the communication priority level determined by the radio base station 10 or the access point AP when the request of the communication priority level is not accepted even when the processing of requiring the radio base station 10 or the access point AP to perform the communication in accordance with the communication priority level determined by the second determination part 130 has been repeated by a predetermined number of times again for a predetermined time. Accordingly, the second communication controller 140 can easily transmit the transmission data according to the communication priority level determined by the second determination part 130. In addition, the second communication controller 140 can prevent the transmission data from not being transmitted for a long time by setting a limit on the number of retry times of requests.

In addition, the second communication controller 140 may cancel the transmission of the transmission data and may request the radio base station 10 or the access point AP to perform the communication according to the communication priority level determined by the second determination part 130 again after the communication quality is improved, for example, when the request of the communication priority level is not accepted by the radio base station 10 or the access point AP. In this case, the acquisition part 120 may acquire the information showing the communication quality of each of the communication networks measured by the communication quality measurement part 30 in order to determine whether the communication quality has improved.

The second communication controller 140 requires the radio base station 10 or the access point AP to perform the communication according to the communication priority level determined by the second determination part 130 when it is determined that there is no influence on the other communication in a case the communication regarding the transmission data is performed according to the required communication priority level on the basis of the information showing the communication quality of each of the communication networks measured by the communication quality measurement part 30. The second communication controller 140 determines that there is no influence on the other communication, for example, when the latency, the throughput, the traffic load, the band use rate, the number of error packets, the number of lost packets, or the like, is the predetermined threshold or less, when the communication speed or the like is the predetermined threshold or more, or the like.

The second communication controller 140 transmits the transmission data to the external device TA through communication based on the communication priority level determined by the radio base station 10 or the access point AP when the request is accepted. Accordingly, the second communication controller 140 can easily transmit the transmission data according to the communication priority level determined by the second determination part 130.

[With Respect to Other Configuration of Access Point AP]

Further, as described above, while the case in which the processing of the communication quality measurement part 30, the processing of the first determination part 32 and the processing of the first communication controller 34 with respect to the Wi-Fi network provided by the access point AP are performed by the radio base station 10 has been described, there is no limitation thereto. The access point AP may include, for example, the communication control device, the communication control device may include the communication quality measurement part 30, the first determination part 32 and the first communication controller 34, and in the processing of the communication quality measurement part 30, the first determination part 32, and the first communication controller 34, which are described above, the processing related to the Wi-Fi network (i.e., the processing other than the processing related to the mobile communication network) may be performed by the communication control device of the access point AP. In this case, the communication quality measurement part 30, the first determination part 32 and the first communication controller 34 included in the radio base station 10 may perform the processing related to the mobile communication network (i.e., the processing other than the processing related to the Wi-Fi network). Accordingly, the communication system 1 can reduce a processing load of the radio base station 10.

Conclusion of First Embodiment

As described above, the communication device 100 of the embodiment is the communication device mounted on the vehicle M, and includes the second communication part 110 in communication with external device TA through the communication by the first communication system provided at the first access point (in an example, the radio base station 10) (in an example, communication via the mobile communication network) or the communication by the second communication system, which is different from the first communication system, provided at the second access point (in an example, the access point AP) (in an example, communication via the Wi-Fi network), the second determination part 130 configured to dynamically determine the communication priority level of a host device with respect to each of the first access point and/or the second access point, and the second communication controller 140 configured to cause the second communication part 110 transmit the information (in an example, the transmission data), which includes the information showing the communication priority level determined by the second determination part 130 and the vehicle information related to the vehicle, with respect to the first access point and the second access point, and the second communication controller 140 causes the second communication part 110 to communicate with the external device TA through the first communication system in accordance with the communication priority level determined at the first access point or the second communication system in accordance with the communication priority level determined at the second access point, causes the second communication part 110 to perform the communication in accordance with the communication priority level determined at the second access point when the communication of the second communication part 110 is switched from the communication of the first access point to the communication of the second access point, and causes the second communication part 110 to perform the communication in accordance with the communication priority level determined at the first access point when the communication of the second communication part 110 is switched from the communication of the second access point to the communication of the first access point.

Here, whenever the vehicle M moves to the communication range A1 of the mobile communication network or moves to the communication range A2 of the Wi-Fi network, if the second determination part 130 performs the processing of determining the communication priority level, the processing is complicated. In addition, when the vehicle M goes back and forth between the communication range A1 of the mobile communication network and the communication range A2 of the Wi-Fi network in a short period of time, there is a case in which there is no change between the communication priority level previously determined by the second determination part 130 and the communication priority level determined according to the movement. According to the communication device 100 of the embodiment, since the second determination part 130 determines that the communication is performed according to the communication priority level determined previously on the basis of the history information 262, it is possible to simply determine the communication priority level according to the communication used by the vehicle.

Second Embodiment

Hereinafter, a second embodiment of the present invention will be described. In the first embodiment, the case in which, whenever a communication range is changed according to movement of the vehicle M, the communication device 100 of the vehicle M determines the communication priority level and requests the radio base station 10 or the access point AP to perform the communication according to the communication priority level has been described. In the second embodiment, the case in which the radio base station 10 requests the other radio base station 10 or the access point AP instead of the vehicle M for communication in accordance with the communication priority level determined by the vehicle M will be described. Further, the same components as in the above-mentioned embodiment are designated by the same reference signs, and description thereof will be omitted.

Figure 10:
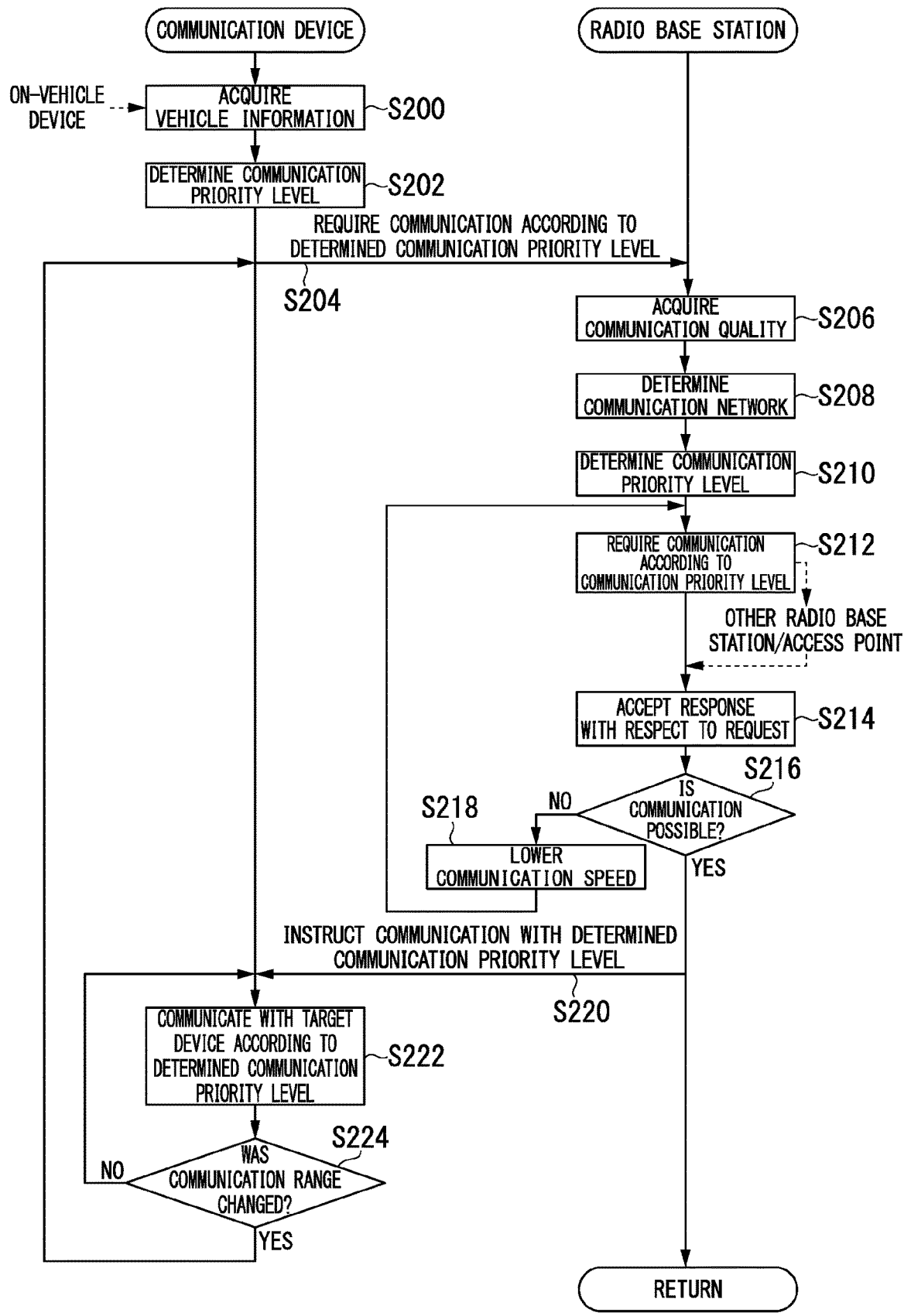
FIG. 10 is a flowchart showing an example of processing executed by a communication system according to a second embodiment.

FIG. 10 is a flowchart showing an example of processing executed by the communication system 1 according to the second embodiment. First, the acquisition part 120 of the communication device 100 acquires the vehicle information from the on-vehicle device 200 (step S200). The second determination part 130 determines an appropriate communication priority level according to the vehicle information on the basis of the vehicle information acquired by the acquisition part 120 (step S202). The second determination part 130 determines, for example, the communication priority level according to the type of the acquired transmission data (vehicle information) on the basis of the reference information 52.

As described above, in general, a data quantity (a transmission unit) that can be transmitted at once in the network is previously determined, and the second communication controller 140 divides the vehicle information into data quantities that can be transmitted at once, and transmits the divided data quantities to the radio base station 10. In this case, the second communication controller 140 firstly transmits the information showing the communication priority level determined by the second determination part 130 to the radio base station 10 through bearer communication before transmission of the divided transmission data is started (step S204). Accordingly, the second communication controller 140 requires the radio base station 10 to perform communication according to the communication priority level determined by the second determination part 130. The first communication controller 34 of the radio base station 10 acquires the vehicle information (moving body information) showing the communication priority level from the vehicle M (moving body) through communication requested from the second communication controller 140.

The first communication part 20 acquires the communication quality of the communication range A1 of the radio base station 10 and the communication quality of the communication range A2 of the access point AP, which are communicable from the position of the vehicle M, as the information related to movement of the vehicle M (moving body) (step S206). The first determination part 32 determines the communication network that communicates with the vehicle M on the basis of the communication quality acquired by the first communication part 20 (step S208). For example, the first determination part 32 determines that the communication is performed by the communication network having a good communication quality among the communication range Aland the communication range A2. That is, the first determination part 32 determines another base station which takes over the communication priority level in the radio base station 10, which will be described below.

In addition, the first determination part 32 determines the communication priority level on the basis of the communication priority level required from the vehicle M and the communication quality of the communication network determined in step S208 (step S210). The first determination part 32 determines that the communication regarding the transmission data is performed by the communication priority level according to the request of the vehicle M when there is no influence on the other communication in the communication network in a case the communication regarding the transmission data is performed in accordance with the communication priority level requested by the communication device 100 on the basis of the information showing the communication quality. In addition, the first determination part 32 determines that the communication regarding the transmission data is performed in accordance with the communication priority level previously determined in the reference information 52 when there is an influence on the other communication in the communication network.

The first communication controller 34 requests the access point AP that provides the communication network determined in step S208 or the other radio base station 10 for communication with the communication priority level based on the determination of the first determination part 32 (step S212). That is, the first communication controller 34 outputs the communication priority level determined by the first determination part 32 to the other radio base station 10. Further, the first communication controller 34 communicates with the other radio base station 10 (not shown) connected to the core network cNW via the core network cNW when requesting the other radio base station 10 to perform communication. Next, the first communication controller 34 receives a response with respect to the request from the access point AP or the other radio base station 10 (step S214).

The first determination part 32 determines whether the response shows that the communication according to the requested communication priority level is possible (step S216). The first determination part 32 determines the communication priority level lower than a communication priority level determined in step S210 (i.e., lowers the communication priority level) when it is determined that the response shows that the communication according to the requested communication priority level is impossible (step S218), and advances the processing to step S212.

Further, the first determination part 32 may omit the processing of steps S212 to S218 when the communication network determined in step S208 is the communication range A1 provided by itself (the radio base station 10), and may determine the communication priority level that can be realized by itself in the processing of step S210.

When it is determined by the first determination part 32 that the response shows that the communication according to the requested communication priority level is possible, the first communication controller 34 performs the priority control of the QoS of the communication priority level based on the determination of the first determination part 32 through the communication using the communication network based on the determination, and, transmits (instructs) the information including the determination result showing that the transmission source device and the target instrument are communicated with each other to the transmission source device (in this case, the communication device 100) (step S220). That is, the first communication controller 34 outputs the communication priority level determined by the first determination part 32 to the vehicle M as a response of the vehicle information (moving body information) acquired by the first communication controller 34. Further, the first communication controller 34 may generate a record in which the information showing the communication priority level determined by the radio base station 10 and the identification information of the mobile communication network provided by the radio base station 10 are associated with each other, and instruct the communication device 100 (the second communication controller 140) to generate (update) the history information 262.

The second communication controller 140 transmits the divided transmission data to the external device TA in sequence through the communication based on the communication priority level determined by the radio base station 10 (step S222). Next, the second communication controller 140 determines whether the communication network (the communication range A1 or the communication range A2) in communication with the vehicle M is changed at each predetermined time interval (step S224). The second communication controller 140 determines that the communication network in communication with the vehicle M is changed, for example, when a change occurs in any one of the communication quality obtained by the communication result of the second cellular communication part 112 and the communication quality obtained by the communication result of the second narrow range communication part 114 (for example, at the positions P1 to P5 shown in FIG. 1).

The second communication controller 140 advances the processing to step S220 when it is determined that the communication network in communication with the vehicle M is not changed. When it is determined that the communication network in communication with the vehicle M is changed, the second communication controller 140 transmits (requests) the information showing the communication priority level determined in step S202 to the communicable radio base station 10 through bearer communication (step S204). For example, the second communication controller 140 transmits the information showing the communication priority level to the radio base station 10 shown in FIG. 1 when the vehicle M moves in the communication range A1 provided by the radio base station 10 shown in FIG. 1, and transmits the information showing the communication priority level to the other radio base station 10 when the vehicle M exits the communication range A1 provided by the radio base station 10 shown in FIG. 1 and moves to another communication range A1 provided another radio base station 10.

Conclusion of Second Embodiment

As described above, the radio base station 10 of the embodiment includes the acquisition part (in this case, the first communication controller 34) configured to acquire the moving body information showing the communication priority level from the moving body (the vehicle M), the first determination part 32 configured to acquire the information (in this case, the information showing the communication quality) related to movement of the moving body, determine the first communication priority level and determine another base station which takes over the first communication priority level, and the output part (in this case, the first communication controller 34) configured to output the communication priority level to the moving body as a response to the vehicle information acquired by the acquisition part and to output the first communication priority level to the other base station.

According to the radio base station 10 of the embodiment, since the radio base station 10 performs the communication related to the communication priority level desired by the vehicle M with respect to the access point AP or the other radio base station 10, the communication priority level according to the communication used by the vehicle M can be simply determined while reducing a processing load of the communication device 100 of the vehicle M.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A communication device mounted on a moving body, comprising:
   a communication part configured to communicate with an external device through a communication network by a first communication system provided at a first access point or a communication network by a second communication system provided at a second access point, the second communication system being different from the first communication system;
   an acquisition part configured to acquire moving body information related to the moving body from one or more on-vehicle instruments mounted on the moving body,
   a determination part configured to dynamically determine a communication priority level regarding a communication of a host device with respect to each of the first access point and/or the second access point, the communication priority level indicating a level in which the communication has priority over other communication performed between the host device and the first access point and/or the second access point; and
   a communication controller configured to cause the communication part to transmit information, which includes information showing the communication priority level determined by the determination part and the moving body information, with respect to each of the first access point and the second access point, wherein the determination part determines to transmit the information, which includes information showing the communication priority level determined by the determination part and the moving body information, by using a communication network having a better communication quality among the communication network by the first communication system provided at the first access point and the communication network by the second communication system provided at the second access point, wherein the determination part acquires identification information of either one of the communication network by the first communication system or by the second communication system, which has been determined to have the better communication quality, by the communication part, wherein the determination part retrieves history information stored in a storage part of the moving body, wherein, when it is determined that a communication priority level is associated with the acquired identification information as the retrieved result, the determination part considers that a communication using either one of the communication network by the first communication system or by the second communication system, which has been determined to have the better communication quality, was performed in the past, and determines a communication priority level related to the communication using either one of the communication network by the first communication system or by the second communication system, which has been determined to have the better communication quality, as the communication priority level of the retrieved result, and wherein, when it is determined that a communication priority level is not associated with the acquired identification information as the retrieved result, the determination part considers that a communication using either one of the communication network by the first communication system or by the second communication system, which has been determined to have the better communication quality, was not performed in the past, and determines a communication priority level corresponding to the moving body information, wherein the communication controller causes the communication part to communicate with the external device through the first communication system in accordance with the communication priority level determined at the first access point or the second communication system in accordance with the communication priority level determined at the second access point, to communicate in accordance with the communication priority level determined at the second access point when the communication of the communication part is switched from the communication of the first access point to the communication of the second access point, and to communicate in accordance with the communication priority level determined at the first access point when the communication of the communication part is switched from the communication of the second access point to the communication of the first access point.

2. The communication device according to claim 1, wherein the first communication system is a cellular system, and the first access point is a base station for communication via the cellular system.

3. The communication device according to claim 1, wherein the second communication system is Wi-Fi, and the second access point is an access point for Wi-Fi communication.

4. The communication device according to claim 1, wherein the moving body information includes status information showing a traveling state of the moving body, and the determination part determines the communication priority level on the basis of the status information.

5. The communication device according to claim 1, wherein the first access point and/or the second access point assign a communication band for communication with the communication part as the communication priority level, and
the communication part performs communication regarding the moving body information with respect to the external device by the communication band assigned at the first access point and/or the second access point.

6. The communication device according to claim 1, wherein the communication controller stores information showing the communication priority level determined at the second access point in the storage part as the history information when the communication of the communication part is switched from the communication in the second access point to the communication in the first access point.

7. The communication device according to claim 1, wherein the communication controller stores information showing the communication priority level determined at the first access point in the storage part as the history information when the communication of the communication part is switched from the communication in the first access point to the communication in the second access point.

8. A communication system comprising:
the communication device according to claim 1;
the first access point; and
the second access point.

9. The communication device according to claim 1, wherein the determination part retrieves the history information using the acquired identification information as a retrieval key, and
the history information is information in which the identification information of the communication network by the first communication system and the identification information of the communication network by the second communication system correspond to information showing communication priority levels which were accepted when the communication part has performed a communication using the communication network by the first communication system with the first access point or a communication using the communication network by the second communication system with the second access point, respectively.

10. A radio base station comprising:
a communication part that includes a first access point which provides a communication network by a first communication system for communicating with a moving body and a second access point which provides a communication network by a second communication system for communicating with the moving body and that is configured to acquire a communication quality of the communication network by the first communication system provided by the first access point and to acquire a communication quality of the communication network by the second communication system provided by the second access point, which are communicable from a position of the moving body, the second communication system being different from the first communication system;

a communication controller configured to acquire moving body information showing a first communication priority level regarding a communication of the moving body with respect to each of the first access point and/or the second access point from the moving body, the first communication priority level being a level in which the communication has priority over other communication performed between the moving body and the first access point and/or the second access point;

a storage part that stores reference information that is information in which identification information, which enables identification of the moving body which is a transmission source of the moving body information, information showing a type of the moving body which is the transmission source, information showing a type of the moving body information transmitted by the moving body which is the transmission source, and information showing the first communication priority level of the moving body information, are associated with each other; and a determination part configured to determine to use a communication network having a better communication quality among the communication network provided at the first access point and the communication network provided at the second access point for communicating with the moving body based on a communication quality acquired by the communication part, configured to determine that a communication regarding the moving body information is performed by the first communication priority level according to a request of the moving body when there is no influence on other communication in the communication network, which has been determined to have the better communication quality, in a case a communication regarding the moving body information is performed in accordance with the first communication priority level requested by the moving body and configured to determine that a communication regarding the moving body information is performed in accordance with the second communication priority level previously determined in the reference information when there is an influence on other communication in the communication network, which has been determined to have the better communication quality, in a case a communication regarding the moving body information is performed in accordance with the first communication priority level requested by the moving body;

wherein the communication controller requests the second access point that provides the communication network, which has been determined to have the better communication quality, or other base station for communication with the first communication priority level or the second communication priority level based on the determination of the determination part.

11. The radio base station according to claim 10, wherein the communication controller acquires the response from the other base station according to the first communication priority level or the second communication priority level, the determination part further determines a third communication priority level having lower priority level than the first communication priority level when a response from the other base station acquired by the communication controller does not show that the communication according to the first communication priority level or the second communication priority level is possible, and the communication controller requests the second access point that provides the communication network, which has been determined to have the better communication quality, or the other base station for communication with the third communication priority level based on the determination of the determination part.

12. A communication control method executed by a computer configured to realize a communication device mounted on a moving body, the method comprising:

communicating with an external device through a communication network by a first communication system provided at a first access point or a communication network by a second communication system provided at a second access point, the second communication system being different from the first communication system;

acquiring moving body information related to the moving body from one or more on-vehicle instruments mounted on the moving body, determining, dynamically, a communication priority level regarding a communication of a host device with respect to each of the first access point and/or the second access point, the communication priority level indicating a level in which the communication has priority over other communication performed between the host device and the first access point and/or the second access point; and causing the communication part to transmit information, which includes information showing the communication priority level determined by the determination part and the moving body information, with respect to each of the first access point and the second access point, wherein the communicating comprises, determining to transmit the information, which includes information showing the communication priority level determined by the determination part and the moving body information, by using a communication network having a better communication quality among the communication network by the first communication system provided at the first access point and the communication network by the second communication system provided at the second access point, wherein the determining comprises:
  acquiring identification information of either one of the communication network by the first communication system or by the second communication system, which has been determined to have the better communication quality, by the communication part,
  retrieving history information stored in a storage part of the moving body, and
  when it is determined that a communication priority level is associated with the acquired identification information as the retrieved result:
    determining that a communication using either one of the communication network by the first communication system or by the second communication system, which has been determined to have the better communication quality, was performed in the past, and
    determining a communication priority level related to the communication using either one of the communication network by the first communication system or by the second communication system, which has been determined to have the better communication quality, as the communication priority level of the retrieved result, and when it is determined that a communication priority level is not associated with the acquired identification information as the retrieved result:
  determining that a communication using either one of the communication network by the first communication system or by the second communication system, which has been determined to have the better communication quality, was not performed in the past, and determines a communication priority level corresponding to the moving body information, wherein the communicating further comprises:
  communicating with the external device through the first communication system in accordance with the communication priority level determined at the first access point or the second communication system in accordance with the communication priority level determined at the second access point, and
  communicating in accordance with the communication priority level determined at the second access point when the communication of the communication part is switched from the communication of the first access point to the communication of the second access point, and
  communicating in accordance with the communication priority level determined at the first access point when the communication of the communication part is switched from the communication of the second access point to the communication of the first access point.

13. A non-transitory computer-readable storage medium, on which a program is stored to cause a computer configured to realize a communication device mounted on a moving body to:
  communicate with an external device through a communication network by a first communication system provided at a first access point or a communication network by a second communication system provided at a second access point, the second communication system being different from the first communication system;
  acquire moving body information related to the moving body from one or more on-vehicle instruments mounted on the moving body,
  determine, dynamically, a communication priority level regarding a communication of a host device with respect to each of the first access point and/or the second access point, the communication priority level indicating a level in which the communication has priority over other communication performed between the host device and the first access point and/or the second access point; and
  cause the communication part to transmit information, which includes information showing the communication priority level determined by the determination part and the moving body information, with respect to each of the first access point and the second access point, wherein the communicating comprises, determining to transmit the information, which includes information showing the communication priority level determined by the determination part and the moving body information, by using a communication network having a better communication quality among the communication network by the first communication system provided at the first access point and the communication network by the second communication system provided at the second access point, wherein the determining comprises:
  acquiring identification information of either one of the communication network by the first communication system or by the second communication system, which has been determined to have the better communication quality, by the communication part,
  retrieving history information stored in a storage part of the moving body, and
  when it is determined that a communication priority level is associated with the acquired identification information as the retrieved result:
    determining that a communication using either one of the communication network by the first communication system or by the second communication system, which has been determined to have the better communication quality, was performed in the past, and
    determining a communication priority level related to the communication using either one of the communication network by the first communication system or by the second communication system, which has been determined to have the better communication quality, as the communication priority level of the retrieved result, and
  when it is determined that a communication priority level is not associated with the acquired identification information as the retrieved result:
    determining that a communication using either one of the communication network by the first communication system or by the second communication system, which has been determined to have the better communication quality, was not performed in the past, and determines a communication priority level corresponding to the moving body information, wherein the communicating further comprises:
  communicating with the external device through the first communication system in accordance with the communication priority level determined at the first access point or the second communication system in accordance with the communication priority level determined at the second access point, and
  communicating in accordance with the communication priority level determined at the second access point when the communication of the communication part is switched from the communication of the first access point to the communication of the second access point, and
  communicating in accordance with the communication priority level determined at the first access point when the communication of the communication part is switched from the communication of the second access point to the communication of the first access point.

* * * * *